July 30, 1946.  A. R. VAN C. WARRINGTON  2,405,081
RELAY ARRANGEMENT FOR PROTECTING ELECTRIC POWER SYSTEMS
Filed Oct. 6, 1944    3 Sheets-Sheet 1
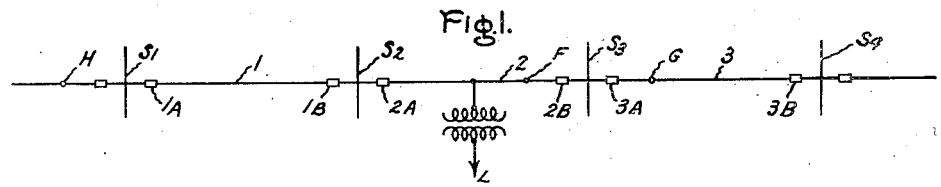
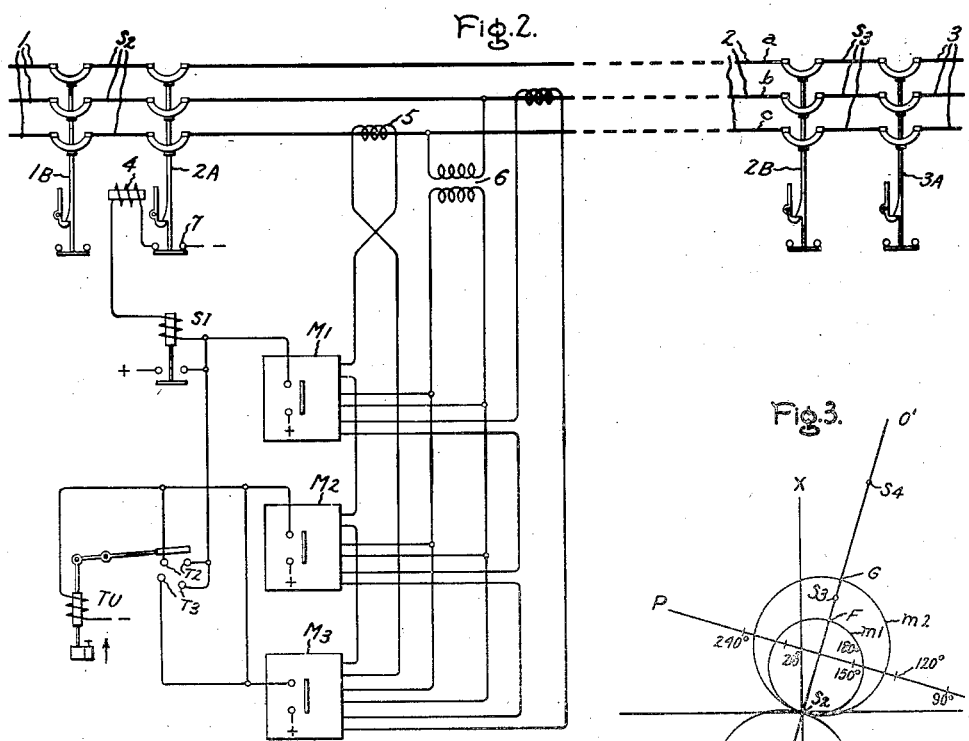
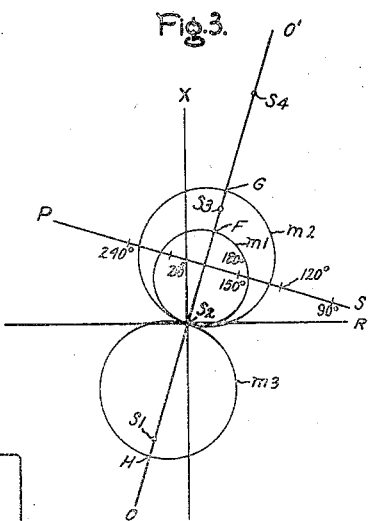
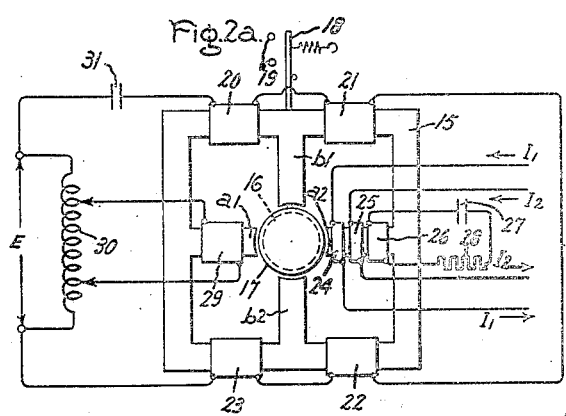
Inventor:
Albert R. van C. Warrington,
by *Henry E. Dunham*
His Attorney.

July 30, 1946.   A. R. VAN C. WARRINGTON   2,405,081
RELAY ARRANGEMENT FOR PROTECTING ELECTRIC POWER SYSTEMS
Filed Oct. 6, 1944                 3 Sheets-Sheet 2
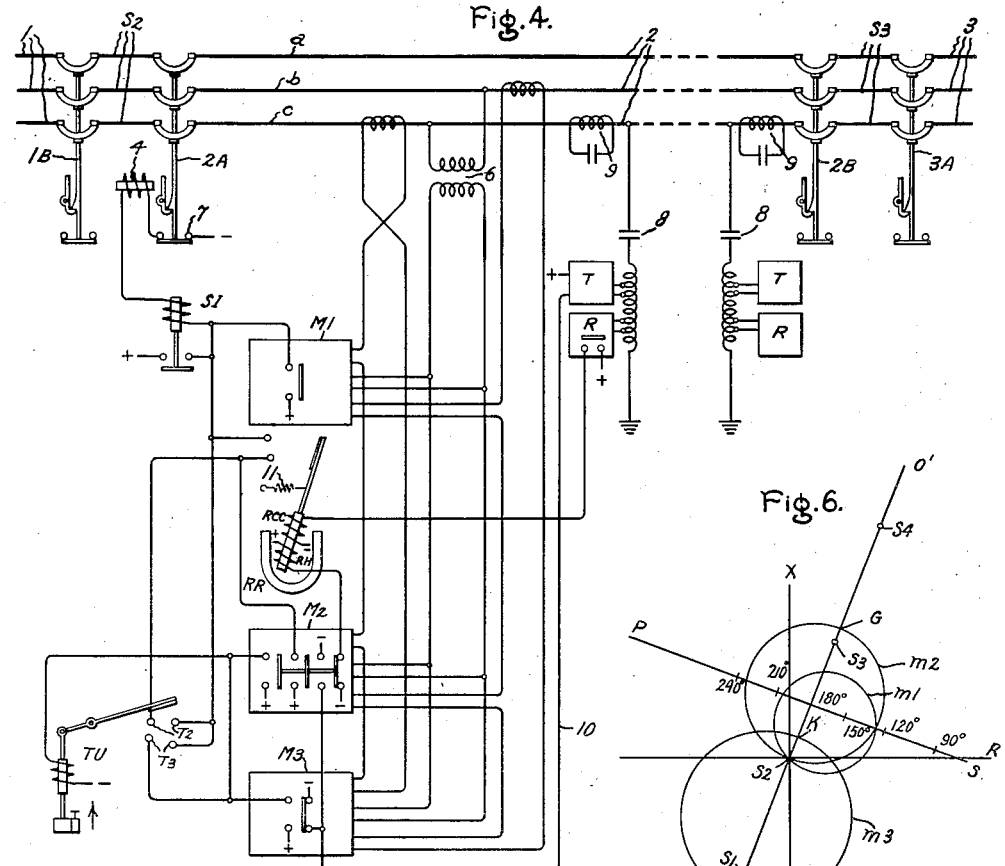
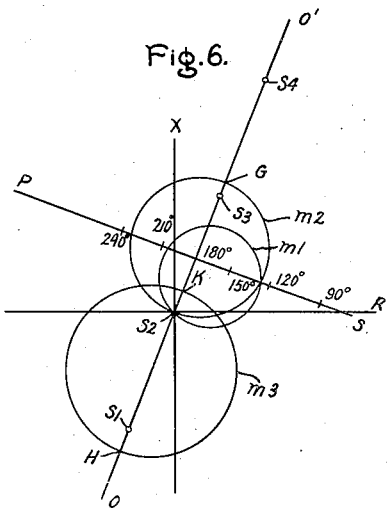
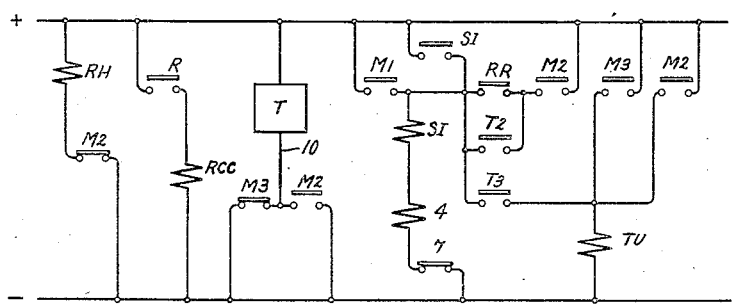
Inventor:
Albert R. van C. Warrington,
by Harry E. Dunham
His Attorney.

July 30, 1946.  A. R. VAN C. WARRINGTON  2,405,081
RELAY ARRANGEMENT FOR PROTECTING ELECTRIC POWER SYSTEMS
Filed Oct. 6, 1944  3 Sheets-Sheet 3
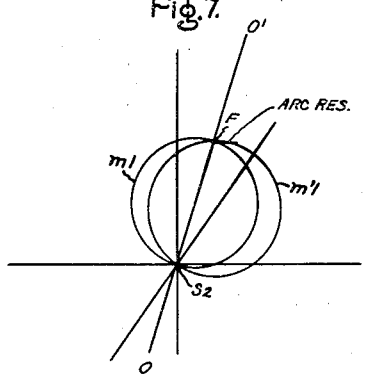
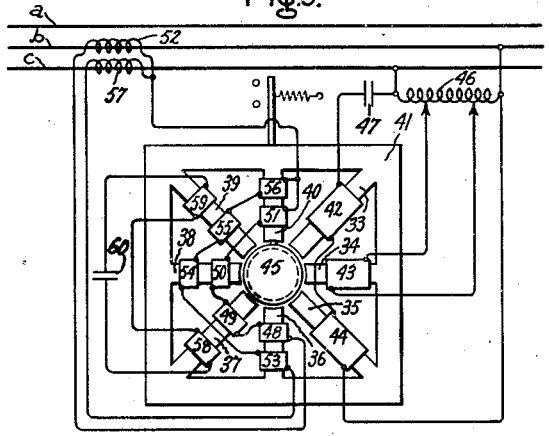
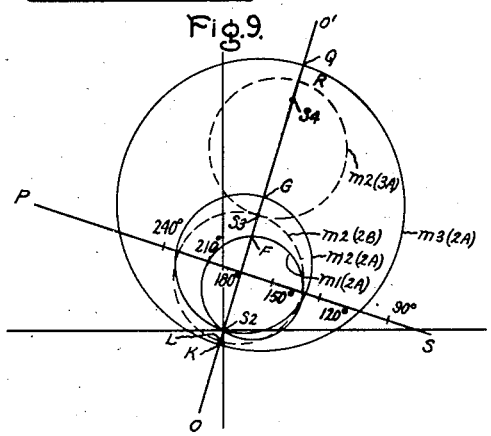
Inventor:
Albert R. van C. Warrington,
by Harry E. Dunham
His Attorney.

Patented July 30, 1946

2,405,081

UNITED STATES PATENT OFFICE 2,405,081

RELAY ARRANGEMENT FOR PROTECTING ELECTRIC POWER SYSTEMS

Albert R. van C. Warrington, Wallingford, Pa., assignor to General Electric Company, a corporation of New York Application October 6, 1944, Serial No. 557,429

24 Claims. (Cl. 175—294)

My invention relates to relay arrangements for protecting electric power systems and particularly to such arrangements which selectively open the circuit interrupters in an electric power system under fault conditions in accordance with the respective distances between the circuit interrupters and the fault.

One object of my invention is to provide an improved relay arrangement of the above-mentioned type which requires a minimum number of relays and relay contacts to effect the desired circuit interrupter operation under fault, power swing and out-of-step conditions.

Another object of my invention is to provide an improved relay rearrangement of the above-mentioned type which will function properly under fault, power swing and out-of-step conditions irrespective of the length of the protected line section or the load current transmitted over the protected line section.

A further object of my invention is to provide an improved relay arrangement of the above-mentioned type which can be used on long or heavily loaded power systems in which the effective impedance to be measured by the distance relays during a power swing or normal operating load conditions may be smaller in magnitude than the maximum fault impedance at which it is desired to have the distance relays respond.

A still further object of my invention is to provide an improved relay arrangement of the above-mentioned type which isolates a protected line section of an electric power system instantly for faults anywhere on the protected line section and also isolates the protected line section in response to out-of-step conditions and power swings from which the system cannot recover, but does not isolate the protected line section in response to loads below the steady state power limit of the system or in response to power swings from which the system can recover without falling out of step.

It is also an object of my invention to provide in a relay arrangement of the above-mentioned type an improved back-up protective arrangement for each circuit interrupter.

In accordance with my invention, I employ distance relays of the voltage restrained directional type having a torque equal to $$K_1 EI \cos(\phi - \theta) - K_2 E^2$$

where E and I are respectively the voltage and current of the circuit being protected, $\phi$ is the power factor angle between E and I, $\theta$ is the phase angle of the relay characteristic, and $K_1$ and $K_2$ are constants. Directional relays of this type are now well known in the art as mho relays and, for simplicity, will hereinafter be referred to as mho relays. The impedance characteristic of such a relay on a polar impedance diagram is a circle which intersects the origin. Each mho relay is designed in a manner well known in the art so that it has a predetermined phase angle relative to the phase angle of the fault impedance and so that it has a predetermined reach relative to the associated line section. In accordance with a preferred embodiment of my invention, one mho relay is arranged so that its reach includes about 90 per cent of the protected line section, another mho relay is set so that its reach includes all of the protected line section and a portion of the line section connected to the other end of the protected line section, and a third mho relay is set so that its reach includes all of each of the nearest adjacent line sections connected to the protected line section by the circuit interrupter being controlled by the relay. In addition, this third mho relay preferably has a current biasing winding which causes its impedance characteristic to be offset relative to the origin. Also, the potential windings of the mho relays are provided with suitable memory action so the voltage across the windings is maintained for several cycles before it decreases to the fault value.

As will be pointed out more fully hereinafter in the specification, the settings of these mho relays may be modified to change their operating characteristics so as to accomplish certain desired results.

My invention will be better understood from the following description when taken in connection with the accompanying drawings, and its scope will be pointed out in the appended claims.

In the accompanying drawings, Fig. 1 is a single line diagram of an electric power system in which my improved relaying arrangement may be employed to control the opening of each of the circuit interrupters thereof; Fig. 2 diagrammatically illustrates a relay protective arrangement embodying my invention which may be used to control each of the circuit interrupters shown in Fig. 1; Fig. 2A illustrates a mho relay construction which is particularly adapted for use in my improved relay arrangement; Fig. 3 is an explanatory diagram showing the relative impedance characteristics of the mho relays employed in the embodiment of my invention shown in Fig. 2, together with the transmission line impedance characteristic and the power swing impedance locus; Fig. 4 diagrammatically illustrates another relay protective arrangement embodying my invention; Fig. 5 is an elementary diagram of the control circuits shown in Fig. 4; Figs. 6 and 7 are explanatory diagrams showing modifications of the embodiments shown in Figs. 2, 4 and 5; Fig. 8 illustrates a modified mho relay construction which may be used in my improved relay arrangement; and Fig. 9 is an explanatory diagram of a modification of the embodiments shown in Figs. 2, 4 and 5.

In the single line diagram shown in Fig. 1, the electric power transmission line includes three line sections 1, 2 and 3 respectively connected in series, between the substations S1 and S4, by the substations S2 and S3. Each of the line sections 1, 2 and 3 has a circuit interrupter at each end thereof such as the circuit interrupters 1A and 1B for respectively connecting opposite ends of the line section 1 to the buses of the substations S1 and S2, the circuit interrupters 2A and 2B for respectively connecting the opposite ends of the line section 2 to the buses of the substations S2 and S3, and the circuit interrupters 3A and 3B for respectively connecting the opposite ends of the section 3 to the buses of the substations S3 and S4. The opening of each of the circuit interrupters shown in Fig. 1 may be controlled by a relay arrangement embodying my invention such, for example, as the embodiment shown in Fig. 2. In this Fig. 2, I have shown an embodiment of my invention in connection with a circuit interrupter at one end of a three-phase line section such, for example, as the circuit interrupter 2A in the line section 2 of Fig. 1. The line section 2 in Fig. 2 is shown as comprising three line conductors $a$, $b$ and $c$, and the circuit interrupter 2A is shown as being provided with a trip coil 4 which when energized is arranged to effect the opening of the circuit interrupter.

In order to simplify the disclosure, I have only shown in Fig. 2 the fault responsive relays which respond to a phase fault involving both of the line conductors $b$ and $c$ of the system. These fault responsive relays are shown as three mho relays M1, M2 and M3, but, as is well known in the art, in actual practice two other similar sets of three mho relays would be provided which would respectively respond to phase-to-phase faults involving the two line conductors $a$ and $c$ and the two line conductors $a$ and $b$. Also, suitable ground fault responsive relay means would probably be provided to effect the opening of the circuit interrupter 2A in response to a ground fault involving any of the line conductors of the line section 2.

In the arrangement shown, the mho relay M1 is assumed to have a reach which does not quite extend to the point where the circuit interrupter 2B at the opposite end of the protected line section 2 is located, the mho relay M2 has a reach which extends into the far adjacent line section 3 a short distance beyond the point where the circuit interrupter 3A is located, and the mho relay M3 has a reach which is in the opposite direction from the reaches of the mho relays M1 and M2 and which extends to a point on the line section beyond the circuit interrupter 1A at the far end of the near adjacent section 1 so that the mho relay M3 responds to any phase-to-phase fault on the line section 1 involving both of the line conductors $b$ and $c$. Preferably the reach of the mho relay M3 is such that it responds to any fault which effects the operation of the mho relay M2 associated with the circuit interrupter 1B.

Since the manner of connecting the windings of the mho relays M1, M2 and M3 of the line section 2 to the current transformer 5 in the line conductor $c$ and the potential transformer 6 across the line conductors $b$ and $c$ so as to obtain the desired impedance characteristics is well known in the art and forms no part of my present invention, and also since the constructional details of the relays constitute no part of my present invention, I have illustrated each of these mho relays diagrammatically in Fig. 1 as rectangles including the contacts of the respective relays, in order to simplify the disclosure.

One well known constuction of such a mho relay which may be used is the starting unit 10 disclosed in United States Letters Patent 2,115,597, granted April 26, 1938, to applicant's assignee on an application filed by O. C. Traver. Another construction of such a relay is illustrated in Fig. 2A. The structure of this relay may be of the type disclosed in United States Letters Patent 2,110,686, granted March 8, 1938, to applicant's assignee on an application filed by V. E. Verrall. As schematically shown in Fig. 2A, the relay comprises a hollow magnetic stator 15 having two angularly displaced pairs of diametrically opposite inwardly projecting salients $a1$, $a2$, and $b1$, $b2$. Centrally positioned relatively to and spaced from the ends of these salients is a magnetic member or stator 16 as described in said Letters Patent 2,110,686 and shown in dotted line since it is covered by a rotor 17 of electric current conducting material which, in the form of a cylindrical cup, is mounted to rotate between the central stator 16 and the ends of the salients $a1$, $a2$, $b1$ and $b2$. A contact-controlling member 18, movable with the cup 17, is arranged to control the contacts 19 of the relay.

On the stator 15 on opposite sides of the salient $b1$ are the windings 20 and 21, and on opposite sides of the salient $b2$ are the windings 22 and 23. These four windings are connected in series and are energized by a voltage such as the voltage between phase conductors $b$ and $c$ in Fig. 2. These four windings are so arranged that each causes flux to flow in the same direction in the salients $b1$ and $b2$. On salient $a2$ are two current windings 24 and 25, which are respectively connected to be energized in accordance with two different line conductor currents such as the currents in line conductors $b$ and $c$ in Fig. 2. The two current windings are so arranged that the flux in the salient $a2$ is proportional to the vector difference of the currents in the two windings. On the salient $a2$ there is also a phase shifting winding 26 which is short-circuited through a suitable capacitor 27 and resistor 28. On the salient $a1$ is a winding 29 which is connected by means of a suitable adjusting transformer 30 to the same voltage source as the series connected windings 20-23 inclusive. In order to obtain a phase displacement between the currents in the voltage windings 20-23 inclusive relative to the current in the voltage winding 29, a capacitor 31 is shown connected in series with the windings 20-23 inclusive.

With the arrangement of windings shown in Fig. 2A, it will be evident that there is exerted on the cup 17 a torque equal to $$E_{(20-23 \text{ incl.})}[(I_{24}-I_{25})\cos(\phi-\theta)-KE_{29}]$$

where $\phi$ is the power factor angle of the circuit, $\theta$ is the relay phase angle, K is a constant, and E and I respectively represent the voltage and current in the correspondingly designated windings.

The relative impedance characteristics of the relays M1, M2 and M3, as arranged in accordance with the embodiment of my invention shown in Fig. 2, are illustrated on the polar diagram constituting Fig. 3. In this figure, the line OO' represents the line impedance of the power system of which the portions S1—S2, S2—S3 and S3—S4 respectively represent the line impedances of the line sections 1, 2 and 3 of Fig. 1 and the circles $m1$, $m2$ and $m3$ are respectively the impedance characteristics of the mho relays M1, M2 and M3 connected to the line section 2 at the substation S2 and controlling the circuit interrupter 2A. The mho relay M1 is shown as having its maximum torque at the same angle as the angle of the line impedance and as having a reach which extends from the point S2 to the point F on the line impedance characteristic OO' so that the relay M1 does not respond to a fault on the line section 2 between the points F and S3. The mho relay M2 is shown as having its maximum torque at the same angle as the angle of the line impedance and as having a reach which extends from the point S2 to the point G on the line impedance characteristic OO' so that it responds not only to a fault on the line section 2 but also to an external fault on the line section 3, the impedance of which falls within the portion S3G of the line impedance characteristic OO'.

The mho relay M3 is shown as having its maximum torque at the same angle as the angle of the line impedance and as having a reach which extends along the line impedance characteristic OO', in the opposite direction to the reaches of the mho relays M1 and M2, from the point S2 to the point H which is beyond the substation S1. Therefore, the mho relay M3 covers all of line 1 and reaches a short distance into the line section to the left of the substation S1 in Fig. 1.

In Fig. 3, the line PS represents the locus of the impedance for different angular displacements of the sources during a power swing or out-of-step condition. As is explained in my paper entitled "Protective relaying for long transmission lines" which appeared in the June, 1943 issue of Electrical Engineering, the line PS is at right angles to the line impedance characteristic OO' and cuts it at a distance from the origin equal to the distance of the electrical center of the system from the relay. For the purpose of this description, it is assumed that in the arrangement illustrated the electrical center of the system is midway between the ends of the line section 2.

Therefore, with the mho relays M1, M2 and M3 of Fig. 2 having the impedance characteristics shown in Fig. 3, it will be evident that a fault between the substation S2 and the point F and involving the conductors $b$ and $c$ effects the operation of the mho relays M1 and M2, a fault between the points F and G and involving the conductors $b$ and $c$ effects the operation of only the mho relay M2, a fault on the line section 3 beyond the point G and involving the conductors $b$ and $c$ effects the operation of none of the mho relays M1, M2 and M3, and a fault on the line section 1 in Fig. 1 or between the substation S1 and the point H on the line section connected to the left of substation S1 in Fig. 1 and involving the conductors $b$ and $c$ effects the operation of only the mho relay M3.

In Fig. 2, the contacts of the mho relay M1, when closed, complete an energizing circuit for the trip coil 4 of the associated circuit interrupter 2A through the winding of a seal-in relay SI and the auxiliary contacts 7 on the circuit interrupter 2A. When either mho relay M2 or M3 is operated, an energizing circuit is completed for a suitable timing device TU which is arranged to close its contacts T2 for a short time interval after the timing unit has been energized for a predetermined time interval and to close its contacts T3 after the timing unit has been energized for a longer predetermined time interval. The closing of the contacts T2 completes an energizing circuit for the trip coil 4 of the circuit interrupter 2A through the winding of the seal-in relay SI and the contacts of the mho relay M2, and the closing of the contacts T3 of the timing device TU completes a similar energizing circuit for the trip coil 4 and the winding of the seal-in relay SI through the contacts of the mho relay M3.

The operation of the relay arrangement for the circuit interrupter 2A in Fig. 2 is as follows: During normal operating conditions, the impedance of the load is such that on the polar diagram shown in Fig. 3 the impedance vector terminates outside of the impedance characteristics $m1$, $m2$ and $m3$ so that the contacts of the three mho relays M1, M2 and M3 are open.

When a fault occurs between the line conductors $b$ and $c$ of the protected line section 2 within the reach of the mho relay M1, this mho relay immediately closes its contacts and completes an energizing circuit for the trip coil 4 of the circuit interrupter 2A and the winding of the seal-in relay SI. The seal-in relay SI completes a locking circuit for itself and the trip coil 4, and this locking circuit remains completed independently of contacts of the mho relay M1 until the circuit interrupter 2A opens its auxiliary contacts 7.

Since the phase fault involving the conductors $b$ and $c$ of the line section 2 is also within the reach of the mho relay M2, this relay closes its contacts and initiates the timing operation of the timing device TU. However, before the timing unit TU can close its contacts T2, the circuit interrupter 2A will ordinarily be opened in response to the operation of the mho relay M1. However, if for any reason the circuit interrupter 2A fails to open in response to the closing of the contacts of the mho relay M1 or the phase fault is beyond the reach of the mho relay M1 but within the reach of the mho relay M2, the timing device TU will be operated for a sufficient length of time to close its contacts T2 and complete through the contacts of the mho relay M2 an energizing circuit for the trip coil 4 of the circuit interrupter 2A and for the winding of the seal-in relay SI to effect the opening of the circuit interrupter 2A.

When a fault occurs between the line conductors $b$ and $c$ of the line section 1, the mho relays M1 and M2 associated with the circuit interrupters 1A and 1B in Fig. 1 are operated in a similar manner to effect the opening of these circuit interrupters. Since such a fault is also within the reach of the mho relay M3 associated with the circuit interrupter 2A, shown in Figs. 1 and 2, this mho relay closes its contacts and initiates the timing operation of the timing device TU, also associated with circuit interrupter 2A. Therefore, if for any reason the circuit interrupter 1B is not opened by its associated mho relays M1 and M2 in response to a fault between line conductors $b$ and $c$ of the line section 1, the circuit interrupter 2A is opened after its associated timing device TU has been in operation long enough to close its contacts T3 and complete through the contacts of the associated mho relay M3 an energizing circuit for the trip coil 4 of the circuit interrupter 2A and the winding of the seal-in relay SI. The opening of the circuit interrupter 2A disconnects the fault on the line section 1 from the line section 2, but since the circuit interrupter 2B at the other end of the line section 2 is still closed, service is not interrupted to any tapped loads that may be connected to the line section 2 such as indicated at L in Fig. 1.

By employing distance relays of the mho type, a single relay performs the functions of both a directional relay and an ohm relay. Also, as will be seen from Fig. 3, the impedance characteristic of a mho relay includes a minimum area around the fault impedance characteristic on a polar impedance diagram so that when used in a protective arrangement for the great majority of transmission line sections which include the electrical center of the electric power system, the portion of the power swing locus that falls within the operating range of the relay is an out-of-step portion of the impedance locus. Therefore, the impedance measured by the relay during a power swing or during any overload condition is of such a character as not to effect the operation thereof.

In the arrangement shown in Fig. 2, the circuit interrupter 2A is opened in response to an out-of-step condition only if the electrical center is within the range of mho unit M2. The M3 mho relay is unlikely to trip even if the electrical center is within its reach because the operating time T3 is generally much longer than the length of time that the power swing takes to cross the characteristic of the relay M3.

Furthermore, by employing for back-up protection a mho relay, such as M3 in Fig. 2, which is set so that its reach is in the opposite direction to the reaches of the associated mho relays M1 and M2, more effective back-up protection is obtained without the risk of operating on swings or heavy loads because the mho relay M3 has to be set for a distance only slightly in excess of the length of the adjacent line section. In the prior art arrangements, the distance relay for accomplishing similar back-up protection had to be set for a distance at least equal to the length of two adjacent line sections. The arrangement shown in Figs. 2 and 3 also has the advantage that when a circuit interrupter is opened by the operation of its associated back-up relay M3, the associated line section is merely disconnected from the fault and service may be still maintained to the associated line section from the other end thereof and to any branch lines which may be tapped off the line section.

In Figs. 4 and 5, I have shown a distance carrier protective relaying arrangement embodying my invention. The distance relays M1, M2 and M3 shown in Fig. 4 are assumed to have the impedance characteristics of the same general character as in Fig. 3 so that the operation of these relays is the same as the embodiment of my invention shown in Fig. 2 except in the case of a fault which is within the reach of the mho relay M1 at one end of the line section 2 but beyond the reach of the mho relay M1 at the other end of the line section. In the arrangement shown in Fig. 2, the circuit interrupter at the end of the line section nearer the fault is opened instantly in response to the operation of its associated mho relay M1 under such a fault condition, but the circuit interrupter at the other end of the line section is not opened until after the associated timing unit TU has closed its contacts T2. In the embodiment of my invention shown in Figs. 4 and 5, instantaneous openings of the circuit interrupters at both ends of the line section are effected in response to a fault anywhere on the line section. Also in Figs. 4 and 5 the mho relay M1 is designed so that it has a different angle of maximum torque than the relay M1 shown in Figs. 2 and 3.

In Figs. 4 and 5, the carrier current system comprises at each of the ends of the line section 2 a carrier current transmitting means T and a carrier current receiving means R, both of which are tuned to the same high frequency and both of which are coupled to one of the line conductors of the line section, such as line conductor c, by means of a suitable coupling capacitor 8. A suitable choke coil or wave trap 9 is provided at each end of the line conductor c so as to prevent the carrier current from being transmitted into the adjacent line section. Since the relaying arrangements at two ends of the line section E may be the same, only the relaying arrangement for the circuit interrupter 2A is shown in detail.

Each end terminal transmitter T is normally rendered inoperative in a manner well known in the art by having a negative potential applied to an associated control conductor 10 through the normally closed contacts of the associated mho relay M3. Each receiver R controls the energization of a holding winding RCC of an associated receiver relay RR so that the winding RCC is energized to maintain the contacts of the receiver relay RR open whenever blocking carrier current is being transmitted over the line conductor c. The receiver relay RR is shown as a polarized relay having a holding winding RH which is normally energized to maintain the contacts of the relay open against the bias of a closing spring 11. When both of the holding windings RCC and RH of the receiver relay RR are deenergized, the contacts of the receiver relay are quickly closed by the spring 11 to complete an energizing circuit for the trip coil 4 of the associated circuit interrupter through the contacts of the mho relay M2 and the winding of the seal-in relay SI.

In order to stop the transmission of blocking carrier current when a fault occurs on the line section 2, the contacts of the mho relay M2 also connect negative potential to the conductor 10 of the associated transmitter T so as to render it inoperative. Mho relay M2, when operated, also interrupts the normally closed energizing circuit for the holding winding RH of the associated receiver relay RR so that its contacts are immediately closed if no blocking carrier current is being transmitted to effect the energization of the holding winding RCC. Mho relay M2 and the associated mho relay M3, when operated, also are arranged to initiate the operation of the timing relay TU in the same manner as in Fig. 2.

The operation of the relaying arrangement shown in Figs. 4 and 5 for the line section 2 is as follows: During normal operating conditions when there is no fault on the power system, the transmitter T at each end of the line section 2 is rendered inoperative by means of the negative potential which is applied to the associated control conductor 10 through the contacts of the associated mho relay M3. The holding winding RH of each receiver relay RR is energized through the contacts of the associated mho relay M2 so that the contacts of each of the receiver relays RR are held open against the bias of the associated closing spring 11.

If a fault occurs between the phase conductors b and c of the protected line section 2 within the reaches of the two mho relays M1 at the opposite ends of the line section, these mho relays M1 immediately complete energizing circuits for the trip coils 4 of the associated circuit interrupters in the manner described in connection with the embodiment shown in Fig. 2 so that both of the circuit interrupters 2A and 2B are instantly opened.

If the phase fault is near one end of the line section 2 so that it is within the reach of the mho relay M1 at that end but beyond the reach of the mho relay M1 at the other end of the section, the mho relay M1 at the end nearer the fault effects the opening of the associated circuit interrupter in the manner above described. Although the assumed fault is not within the reach of the mho relay M1 at the other end of the line section 2, it is within the reach of the mho relay M2 at this other end of the section 2 and also within the reach of the mho relays M3 associated with the circuit interrupters 1B and 3A respectively. For example, if the fault on the line section 2 is near the substation S3 beyond the reach of the mho relay M1 associated with the circuit interrupter 2A, the mho relays M1 and M2 associated with the circuit interrupter 2B are operated, the mho relay M2 associated with circuit interrupter 2A is operated, and the mho relays M3 associated respectively with the circuit interrupters 1B and 3A are operated. The mho relays M3 associated with the circuit interrupters 1B and 3A respectively open their normally closed contacts and remove the negative potentials from the associated control conductors 10 so that the associated transmitters T become operative to transmit a blocking carrier current over the line conductor c of the line sections 1 and 3 respectively. This blocking current effects the operation of the receiver R at each end of the associated line sections so that the holding winding RCC at each end thereof is energized to maintain the contacts of the associated receiver relay RR open as long as the blocking current is transmitted. In this manner the circuit interrupters 1A, 1B, 3A and 3B in Fig. 1 are prevented from being opened by an operation of their associated mho relays M2 in response to a fault on line section 2.

The mho relay M2 associated with circuit interrupter 2A, by opening its normally closed contacts, interrupts the circuit of the holding winding RH of the associated receiver relay RR. Since, under the assumed fault condition, the mho relay M3 associated with neither the circuit interrupter 2A nor 2B is operated to start the transmission of carrier current, the deenergization of the holding winding RH of the receiver relay RR associated with the circuit interrupter 2A allows the spring 11 of the relay to close its contacts immediately and completes an energizing circuit for the trip coil 4 of the circuit interrupter 2A through the winding of the associated seal-in relay SI, the contacts of the associated mho relay M2 and the auxiliary contacts 7 of the circuit interrupter 2A. Therefore, since circuit interrupter 2B is immediately opened by its associated mho relay M1, both of the circuit interrupters 2A and 2B are immediately opened even when the internal fault on the line section 2 is so close to substation S3 that it is beyond the reach of the mho relay M1 associated with the circuit interrupter 2A.

It will be evident that, when the internal fault is close to the substation S2 so that it is beyond the reach of the mho relay M1 associated with the circuit interrupter 2B, the mho relay M2 and the receiver relay RR associated with the circuit interrupter 2B effect in a similar manner the opening of the circuit interrupter 2B as soon as the associated mho relay M2 effects the deenergization of the holding winding RH of the associated receiver relay RR, and that the circuit interrupter 2A is immediately opened by the operation of the associated mho relay M1.

From the above description, it is evident that any internal fault on the line section 2 involving the two line conductors b and c effects the immediate and substantially simultaneous opening of the circuit interrupters 2A and 2B so as to isolate the protected line section 2 from the rest of the power system.

If for any reason the circuit interrupter 2A fails to open in response to the operation of its associated mho relay M1 or its associated receiver relay RR in response to a fault within the reach of its associated mho relay M2, this mho relay M2 effects the completion of an energizing circuit for the trip coil 4 of the circuit interrupter 2A, in same manner as in Fig. 2, as soon as the timing unit TU, the operation of which is initiated by the operation of the mho relay M2, has closed its contacts T2.

If a phase fault involving the phase conductors b and c occurs on line section 1 to the left of the substation S2 but within the reach of the mho relay M3 associated with the circuit interrupter 2A, this mho relay M3, by opening its normally closed contacts, removes negative potential from the associated conductor 10 so that the associated transmitter T is rendered operative in the manner heretofore described to transmit blocking carrier current over the line conductor c of the line section 2 to maintain the contacts of the receiver relay RR at each end thereof open. Since the assumed phase fault is to the left of the substation S2, neither the mho relay M1 nor the mho relay M2 associated with the circuit interrupter 2A is operated by the fault so that neither of these relays operates to effect an opening of the circuit interrupter 2A.

The fault on the line section 1, however, may be within the reach of the mho relay M2, associated with the circuit interrupter 2B, so that it deenergizes the holding winding RH of its associated receiver relay RR, but since carrier current is being transmitted over the line section 2 by the transmitter T associated with the circuit interrupter 2A, due to its associated mho relay M3 being operated, the other holding winding RCC of the receiver relay RR associated with the circuit interrupter 2B is energized to prevent the associated mho relay M2 from effecting the energization of the associated circuit interrupter 2B in response to a fault on line section 1. Therefore, it will be evident that the mho relay M3 associated with the circuit interrupter 2A should reach farther along the line section 1 than does the mho relay M2 associated with the circuit interrupter 2B at the other end of the line section 2.

The operation of the mho relay M3 associated with the circuit interrupter 2A initiates the operation of the associated timing unit TU. If the assumed phase fault on the line section 1 is not immediately cleared by the pilot relaying equipment associated with the line section 1 to the left of the circuit interrupter 2A, the timing unit TU associated with the circuit interrupter 2A closes its contacts T3 after a predetermined time interval and completes an energizing circuit for the trip coil 4 of the circuit interrupter 2A through the auxiliary contacts 7 on the circuit interrupter 3, the winding of the associated seal-in relay SI and the contacts of the associated mho relay M3 to effect the opening of the circuit interrupter 2A thereby disconnecting the faulty line section 1 from the line section 2 which, however, is still connected to a portion of the power system by the circuit interrupter 2B.

Since the operating torque of a mho relay is proportional to the product of EI where E and I are respectively the voltage and the current of the circuit being protected, the voltage circuit of the mho relay M1 in Fig. 2 is preferably provided with suitable means, examples of which are well known in the art, whereby even in case of a short circuit in the immediate vicinity of the point where the relay is connected, the voltage which is applied to the operating voltage winding is maintained at a sufficiently high value for a few cycles after the fault occurs so the relay develops sufficient torque to effect an instantaneous opening of the associated circuit interrupter. Such a voltage sustaining arrangement, however, has apparently no advantage for mho relays M2 and M3 in controlling the timer unit TU in the relaying arrangement of Fig. 2 because the energizing circuits of the associated trip coil 4 controlled by these mho relays are not completed until after the associated timing unit TU has been in operation long enough to close its contacts T2 and T3, and these time intervals are usually longer than the length of time the voltage applied to the operating winding of the mho relay can be maintained at a sufficiently high operating value under such short circuit conditions. However, when mho relays are used in a carrier relaying arrangement as described above and illustrated in Fig. 4, the mho relay M3 has to operate quickly to start the transmission of carrier current and the mho relay M2 has to operate quickly to complete the trip circuit through the receiver relay contacts. Therefore in order to obtain rapid and positive action of the mho relays M2 and M3 under low voltage conditions produced by a nearby short circuit a suitable memory circuit is required for each voltage winding of the operating units of all three mho relays M1, M2 and M3 in Fig. 4.

In order to obtain proper operation of the mho relay M3 under remote fault conditions which require tripping after the memory action has expired, it is preferable in most cases to modify the mho relay M3 so that it also has an operating torque dependent solely upon the line current, in which event its impedance characteristic does not pass through the origin, as in the vector diagram shown in Fig. 2, but instead also embraces a small portion of the adjacent line section 2 near the substation S2, such as the portion S2—K shown in Fig. 6. Such a characteristic may be obtained by designing the relay in a well-known manner so that its torque is equal to $$K_1 EI \cos(\phi-\theta) - K_2 E^2 + K_3 I^2.$$

As pointed out in an article by A. R. van C. Warrington, published on pages 370–4 of the General Electric Review for September, 1940, such a relay has a circle for a polar impedance characteristic and, by properly designing the relay, the origin may be at any point within the circuit and at any desired distance from the center of the circle. Since such a modified mho relay, which will be referred to hereinafter and also in the claims as a modified mho relay, has two operating torques, one of which is proportional to the square of the circuit current only, sufficient torque to operate the relay can be obtained even under fault conditions which result in the circuit voltage at the point where the relay is connected being reduced to zero.

In Fig. 8, I have schematically illustrated a modified mho relay construction of the type shown in the aforesaid Verrall Letters Patent 2,110,686, which may be used as relay M3 in the relay arrangements shown in Figs. 2, 4, and 5. This relay has eight inwardly projecting salients 33 to 40, inclusive, respectively arranged in a clockwise direction around the inside of a hollow magnetic stator 41. On the salients 33, 34 and 35 are the voltage windings 42, 43 and 44, respectively, which when energized produce a torque on the rotor 45 proportional to the product of the voltages energizing the windings and a function of the phase angle between these voltages. As shown, the voltage winding 43 is connected across the phase conductors b and c of the polyphase circuit by means of a suitable adjusting transformer 46, and the voltage windings 42 and 44 and a capacitor 47 are connected in series between the phase conductors b and c.

On the salients 36, 37, 38 and 40 are the current windings 48, 49, 50 and 51, respectively, which are connected in series with the secondary winding of a current transformer 52, the primary winding of which is connected in series with the phase conductor b. On the salients 36, 38, 39 and 40 are the current windings 53, 54, 55 and 56, respectively, which are connected in series with the secondary winding of a current transformer 57, the primary winding of which is connected in series with the phase conductor c. On the salients 37 and 39 are the current windings 58 and 59 which are connected in series in a circuit containing a capacitor 60.

The windings on the salients 33 and 35 to 40, inclusive, are arranged in a manner well known to those skilled in the art so that the fluxes in the salients 33 and 40 and in the salients 35 and 36 respectively cooperate to produce an operating torque on rotor 45 proportional to a predetermined function of the product of the voltage across the line conductors b and c and the difference in the currents in the line conductors b and c, and the fluxes in the salients 36, 37 and 38 and in the salients 38, 39 and 40 respectively cooperate to produce an operating torque on the rotor proportional to a predetermined function of the currents in the line conductors b and c, said operating torques being in a direction to close the contacts of the relay whereas the torque produced by the voltage windings 42, 43 and 44 is in a direction to maintain the contacts of the relay open.

It will be apparent that if the mho relay M3 in Fig. 3 is a modified mho relay having the operating characteristic m3 shown in Fig. 6, it will also respond to faults on the line section 2 near the substation S2 so that under these fault conditions the operation of the transmitter T associated with the circuit interrupter 2A is initiated by the mho relay M3 opening its contacts and removing negative potential from the control conductor 10. However, such a fault on the line section 2 also initiates the operation of the mho relay M2 associated with the circuit interrupter 2A. As soon as this relay closes its contacts and restores negative potential to the associated control conductor 10, the transmission of blocking carrier current from the transmitter T associated with the circuit interrupter 2A is stopped. The receiver relay RR at the other end of the line section then can close its contacts and, in conjunction with the relay M2 at that other end of the line section 2, effect in the manner heretofore described the immediate opening of the circuit interrupter 2B.

I have found that when my improved relaying arrangement is used on certain electric systems, which in practice are very few in number, it is desirable also to provide the mho relays MI and M2 with a slight current bias. Such an electric system, for example, is one in which it is necessary to obtain the voltage for energizing the voltage windings of the mho relays from capacitance potential devices which are connected to the load side of the circuit breaker. In such a case, rapid operation of the mho relays MI and M2 is insured by the memory action producing means when a fault first appears, but if the fault is still connected to the load circuit when the circuit breaker is reclosed, the relay action may be very sluggish. In fact, if the fault is a very low impedance one and very close to where the mho relays are connected, the voltage applied to the relays may not be high enough to produce sufficient operating torque to operate the relays. In such a case, the relays should be provided with a small amount of current operating torque. This torque should be such that the relays will operate on current alone only if the current exceeds a certain value, the magnitude of which indicates that the fault must be an internal one within the protected section rather than an external fault. Such a distinction is always possible where there is a source of power at the adjacent bus section to which the circuit breaker connects the protected line section. Therefore, it should be understood that in the claims the expression "mho relay" should be interpreted to also cover a mho relay which has a very small amount of current bias.

While in the embodiments of my invention shown in Figs. 2 and 3, I have assumed that the mho relays develop their maximum torque at the same angle as the line impedance angle, there is a definite advantage in some cases in having each mho relay MI designed so that its angle of maximum torque is less lagging than the line impedance. Since the resistance of a fault may sometimes increase materially after it has once been established, particularly if the fault is an arcing fault, it is desirable to make the impedance characteristic of the relay MI so that it is operative in response to such high resistance faults at the other end of the line section portion protected thereby. How this result can be accomplished will be seen more clearly from Fig. 7, which illustrates the impedance characteristics $m1$ and $m'1$ of two mho relays which have exactly the same reach along the line impedance characteristic but which have been designed so that they develop their maximum operating torques at different angles. The mho relay having the characteristic $m1$ has the same angle as the line impedance, whereas the mho relay having the characteristic $m'1$ has a less lagging angle than the line impedance. It will be seen, however, that the relay having the characteristic $m'1$ responds to faults containing higher values of resistance than the relay having the characteristic $m1$ since it embraces more of the area to the right of the portion S2F of the line impedance characteristic OO'.

In order to insure that it will respond to a fault anywhere within the reach of the mho relay M2 associated with circuit interrupter IB and therefore will serve as a back-up relay for faults within the reach of that mho relay M2, the mho relay M3 associated with the circuit interrupter 2A, in the relay arrangements shown in Figs. 2, 4 and 5, has to have a reach which extends further into the line section to the left of substation SI than does the reach of the mho relay M2 associated with the circuit interrupter IB. Therefore, the relay M3 in the relay arrangements of Figs. 2, 4 and 5, as heretofore described, is operative to effect the opening of the circuit interrupter 2A in the event that the circuit interrupter IB fails to be opened by a fault within the reach of its associated mho relay M2.

In some cases, however, it may be desirable to have the circuit interrupter 2A function as backup protection for the circuit interrupter 3A instead of for the circuit in circuit interrupter IB. In such a case, the mho relay M3 associated with the circuit interrupter 2A has a reach which is in the same direction as its associated mho relays MI and M2 and which extends in Fig. 1 beyond the far end of the far adjacent line section 3 a greater distance than does the reach of the mho relay M2 associated with the circuit interrupter 3A. Also, in order that the relay M3 may operate satisfactorily in response to faults near the circuit interrupter 2A, it may be desirable to use a modified mho relay having an operating characteristic similar to the operating characteristic $m3$ shown in Fig. 9. In this Fig. 9, the modified mho relay M3 has a reach which extends from a point K in the line section I which is nearer the substation SI than the point L reached by the mho relay M2 associated with the circuit interrupter 2B to a point Q which is in the line section beyond the substation S4 and which is also beyond the point R reached by the mho relay M2 associated with the circuit interrupter 3A.

When a modified mho relay M3 having the characteristic $m3$ shown in Fig. 9 is used in the relay arrangements shown in Figs. 2, 4 and 5, it effects the opening of the circuit interrupter 2A in response to any fault that occurs within its range and remains connected to the system for a sufficient length of time to allow the associated timing unit TU to close its contacts T3.

In Figs. 4 and 5, the operation of the modified mho relay M3 also starts the associated transmitter T, but if the fault is within the reach of the associated mho relay M2, this latter relay immediately renders the associated transmitter T inoperative. Since the corresponding relays M2 and M3 associated with the circuit interrupter 2B at the other end of the line section 2 function in a similar manner in response to a fault within the reaches of both of these relays, it is evident that a fault anywhere on the line section 2 results in the mho relays M2 at the two ends thereof rendering the associated transmitters T inoperative and effecting the immediate opening of the associated circuit interrupter. When, however, the fault is outside of the line section 2 and within the reach of the modified mho relay M3, blocking carrier current is continuously transmitted over the line section 2 from the transmitter T at one end thereof to prevent the circuit interrupters 2A and 2B from being opened. For example, if the fault is on the line section I and within the reach of the modified mho relay M3 associated with circuit interrupter 2A, it is outside of the reach of the mho relay M2 associated with the circuit interrupter 2A so that its associated transmitter T remains in operation to transmit carrier current over the line section 2 and thereby prevent the circuit interrupters 2A and 2B from being opened. Similarly, if the fault is on the line section 3 and within the reach of the modified mho relay M3 and the mho relay M2 associated with the circuit interrupter 2A, it is also within the reach of the modified mho relay M3 but outside of the reach of the mho relay M2 associated with the circuit interrupter 2B so that its associated transmitter T remains in operation to transmit carrier current over the line section 2 and thereby prevent the circuit interrupters 2A and 2B from being opened.

While a relay having the impedance characteristic $m3$ in Fig. 9 may function properly on short lines and lines carrying relatively small loads, it may not function properly on long or heavily loaded lines due to the fact that the relay has such a large impedance range that it may be operated on such lines under power swing or overload conditions. It will be evident, however, that by using a relay having the impedance characteristic $m3$ in Fig. 3 or 6 satisfactory operation can be obtained on such lines under power swing and overload conditions because the impedances to which such a relay responds are confined to an area nearer the line impedance characteristic.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a relay arrangement for completing the trip circuit of a circuit interrupter at one end of a line section of an electric power system, the combination of a mho relay having a reach extending from said one end to a point on said line section near the far end thereof and also having contacts in said trip circuit, a timing device controlling contacts in said trip circuit, and a second mho relay having a reach extending from said one end to a point beyond the far end of said line section for initiating the operation of said timing device.

2. In a relay arrangement for completing the trip circuit of a circuit interrupter at one end of a line section of an electric power system, the combination of a mho relay having a reach extending from said one end to a point on said line section near the far end thereof and also having contact in said trip circuit, a shunt circuit around said contacts, a timing device having contacts in said shunt circuit, and a second mho relay having a reach extending from said one end to a point beyond the far end of said line section for initiating the operation of said timing device and also having contacts in said shunt circuit.

3. In a relay arrangement for completing the trip circuit of a circuit interrupter at one end of a line section of an electric power system, a mho relay having a reach extending from said one end to a point on said line section near the far end thereof and also having contacts in said trip circuit, said relay having its maximum torque angle at a different angle than the line impedance angle of the system.

4. In a relay arrangement for completing the trip circuit of a circuit interrupter at one end of a line section of an electric power system, a mho relay having a reach extending from said one end to a point on said line section near the far end thereof and also having contacts in said trip circuit, said relay having its maximum torque angle at a less lagging angle than the line impedance angle of the system.

5. In a relay arrangement for completing the trip circuit of a circuit interrupter at one end of a line section of an electric power system, the combination of a mho relay having a reach extending from said one end to a point on said line section near the far end thereof, a second mho relay having a reach extending from said one end to a point beyond the far end of said line section, said relays respectively having different maximum torque angles relative to the line impedance angle of said system, and contacts in said trip circuit controlled by said relays.

6. In a relay arrangement for completing the trip circuit of a circuit interrupter at one end of a line section of an electric power system, the combination of a mho relay having a reach extending from said one end to a point on said line section near the far end thereof, a second mho relay having a reach extending from said one end to a point beyond the far end of said line section, said relays respectively having maximum torque angles which are less lagging than and substantially the same as the line impedance angle of said system, and contacts in said trip circuit controlled by said relays.

7. In a relay arrangement for completing the trip circuit of a circuit interrupter in an electric power system, the combination of a plurality of mho relays respectively having different reaches extending from said circuit interrupter and having parallel connected contacts in said trip circuit, a timing device having contacts which are closed in series with said contacts of one of said relays after said device has been in operation for a predetermined time, and means controlled by one of said relays for initiating the operation of said timing device.

8. In a relay arrangement for completing the trip circuit of a circuit interrupter in an electric power system, the combination of a plurality of mho relays respectively having different reaches extending from said circuit interrupter and having parallel connected contacts in said trip circuit, a timing device having contacts which are closed in series with said contacts of one of said relays after said device has been in operation for a predetermined time and having other contacts which are closed in series with said contacts of another of said relays after said device has been in operation for a different predetermined time, and means controlled by one of said relays for initiating the operation of said timing device.

9. In a relay arrangement for completing the trip circuit of a circuit interrupter in an electric power system, the combination of a mho relay having a reach extending a predetermined distance from said circuit interrupter and having contacts in said trip circuit, a second mho relay having a reach extending a different predetermined distance from said circuit interrupter and having contacts connected in parallel with said first mentioned contacts, a third mho relay having a reach extending a different predetermined distance from said circuit interrupter than said other mho relay and having contacts connected in parallel with said first mentioned contacts, a timing device having contacts which are closed in series with said contacts of said second mho relay after said device has been in operation for a predetermined time and other contacts which are closed in series with said contacts of said third mho relay after said device has been in operation for a longer predetermined time, and means controlled by said second mho relay for initiating the operation of said timing device.

10. In a relay arrangement for completing the trip circuit of a circuit interrupter in an electric power system, the combination of a mho relay having a reach extending a predetermined distance from said circuit interrupter and having contacts in said trip circuit, a second mho relay having a reach extending a different predetermined distance from said circuit interrupter and having contacts connected in parallel with said first mentioned contacts, a third mho relay having a reach extending a different predetermined distance from said circuit interrupter than said other mho relay and having contacts connected in parallel with said first mentioned contacts, a timing device having contacts which are closed in series with said contacts of said second mho relay after said device has been in operation for a predetermined time and other contacts which are closed in series with said contacts of said third mho relay after said device has been in operation for a longer predetermined time, and means controlled by said second and third mho relays for initiating the operation of said timing device.

11. In a relay arrangement for completing the trip circuit of a circuit interrupter at one end of a line section of an electric power system, the combination of distance relaying means for immediately completing said trip circuit in response to a fault on said line section, and means including a mho relay having a reach extending from said circuit interrupter to a point beyond the far end of the adjacent line section nearest said circuit interrupter for effecting the completion of said trip circuit a predetermined time after the occurrence of a fault that effects the operation of said mho relay.

12. In a relay arrangement for completing the trip circuit of a circuit interrupter at one end of a line section of an electric power system, the combination of distance relaying means for completing said trip circuit in response to a fault on said line section, and means including distance relaying means having a reach including all of a near adjacent line section but only a portion of said first mentioned line section for effecting the completion of said trip circuit a predetermined time after the occurrence of a fault that effects the operation of said last mentioned distance relaying means.

13. In a relay arrangement for completing the trip circuit of a circuit interrupter at one end of a line section of an electric power system, the combination of distance relaying means for immediately completing said trip circuit in response to a fault on said line section, and means including a modified mho relay having a reach including all of a near adjacent line section but only a portion of said first mentioned line section for effecting the completion of said trip circuit a predetermined time after the occurrence of a fault that effects the operation of said modified mho relay.

14. In a relay arrangement for completing the trip circuit of a circuit interrupter at one end of a line section of an electric power system, the combination of distance relaying means for immediately completing said trip circuit in response to a fault on said line section, and time back-up means for effecting the completion of said trip circuit comprising a distance relay having a reach which includes a smaller portion of said line section than said first mentioned distance relaying means.

15. In a relay arrangement for completing the trip circuit of a circuit interrupter at one end of a line section of an electric power system, the combination of distance relaying means for immediately completing said trip circuit in response to a fault on said line section, said means comprising a distance relay having a reach extending from said one end to a point on said line section, and time back-up means for effecting the completion of said trip circuit comprising a distance relay having a reach which extends from said one end in the opposite direction to that of said first mentioned distance relay.

16. In a relay arrangement for completing the trip circuit of a circuit interrupter at one end of a line section of an electric power system, the combination of distance relaying means for immediately completing said trip circuit in response to a fault on said line section, and means including a modified mho relay having a reach including all of a near adjacent line section but only a portion of said first mentioned line section for effecting the completion of said trip circuit a predetermined time after the occurrence of a fault that effects the operation of said modified mho relay, said modified mho relay having its maximum torque angle at approximately the same angle as the line impedance angle of the system.

17. In a relay arrangement for completing the trip circuit of a circuit interrupter at one end of a line section of an electric power system, the combination of a mho relay for immediately completing said trip circuit in response to a fault on said line section, and means including a distance relay having a reach including the entire length of a line section immediately adjacent said circuit interrupter and only a portion of said first mentioned line section for effecting independently of said mho relay the completion of said trip circuit a predetermined time after the occurrence of a fault that effects the operation of said distance relay.

18. In a relay arrangement for completing the trip circuit of a circuit interrupter at one end of a line section of an electric power system, the combination of a mho relay for immediately completing said trip circuit in response to a fault on said line section, and means including a modified mho relay having a reach including the entire length of a line section immediately adjacent said line circuit interrupter and only a portion of said first mentioned line section for effecting the completing of said trip circuit a predetermined time after the occurrence of a fault that effects the operation of said modified mho relay.

19. A carrier current relaying arrangement for respectively completing the trip circuits of the circuit interrupters at the ends of a line section of a sectionalized electric power system comprising for each circuit breaker the combination of means for transmitting carrier current of a predetermined frequency over said line section, carrier current receiving means tuned to said predetermined frequency, a mho relay having a reach extending from the respective end to a point on said line section near the far end thereof and also having contacts in the respective trip circuit, a normally open shunt circuit around said contacts, a second mho relay having a reach extending beyond the far end of said line section, a distance relay having a predetermined reach for initiating the operation of said transmitting means, means controlled by said second mho relay for rendering said transmitting means inoperative, and means jointly controlled by said second mho relay and said receiving means for completing said shunt circuit when said second mho relay is operated and said receiving means is receiving no carrier current.

20. A carrier current relaying arrangement for respectively completing the trip circuits of the circuit interrupters at the ends of a line section of a sectionalized electric power system comprising for each circuit breaker the combination of means for transmitting carrier current of a predetermined frequency over said line section, carrier current receiving means tuned to said predetermined frequency, a mho relay having a reach extending beyond the far end of said line section, a distance relay having a reach including at least a portion of the adjacent line section nearest the respective circuit interrupter, means controlled by said distance relay for initiating the operation of said transmitting means in response to a fault within the range of said distance relay, means controlled by said mho relay for rendering said transmitting means inoperative, and means jointly controlled by said mho relay and said receiving means for completing the respective trip circuit when said mho relay is operated and said receiving means is receiving no carrier current.

21. A carrier current relaying arrangement for respectively completing the trip circuits of the circuit interrupters at the end of a line section of a sectionalized electric power system comprising for each circuit breaker the combination of means for transmitting carrier current of a predetermined frequency over said line section, carrier current receiving means tuned to predetermined frequency, a mho relay having a reach extending beyond the far end of said line section, a second mho relay for initiating the operation of said transmitting means and having a reach extending into the adjacent line section nearest the respective circuit interrupter to a point beyond the point reached by the mho relay at the far end of said first mentioned line section corresponding to said first mentioned mho relay, means controlled by said first mentioned mho relay for rendering said transmitting means inoperative, and means jointly controlled by said second mho relay and said receiving means for completing said trip circuit when said second mho relay is operated and said receiving means is receiving no carrier current.

22. A carrier current relaying arrangement for respectively completing the trip circuits of the circuit interrupters at the end of a line section of a sectionalized electric power system comprising for each circuit breaker the combination of means for transmitting carrier current of a predetermined frequency over said line section, carrier current receiving means tuned to said predetermined frequency, a mho relay having a reach extending beyond the far end of said line section, a modified mho relay for initiating the operation of said transmitting means and having a reach including all of the adjacent line section nearest the respective circuit interrupter and also a portion of said first mentioned line section, means controlled by said first mentioned mho relay for rendering said transmitting means inoperative, and means jointly controlled by said second mho relay and said receiving means for completing said trip circuit when said second mho relay is operated and said receiving means is receiving no carrier current.

23. In a carrier current protective relaying system of a character such that the tripping of a circuit interrupter at one end of a protected line section occurs only when no carrier current is being transmitted, means for initiating the flow of carrier current at an end of the protected line section comprising a mho relay responsive to the flow of power in one predetermined direction at said last mentioned end, and means for preventing carrier current from being transmitted from said last mentioned end comprising a second mho relay responsive to the flow of power in the opposite direction at said point.

24. In a relay arrangement for completing the trip circuit of a circuit interrupter at one end of a line section of an electric power system, the combination of a distance relay for immediately completing said trip circuit in response to a fault on said line section within a predetermined distance from said circuit interrupter, a plurality of mho relays respectively having different reaches in the direction of the far end of said line section and having parallel connected contacts in said trip circuit, timing means having contacts which are closed in series with said contacts of one of said mho relays after said timing means has been in operation for a predetermined time and having other contacts which are closed in series with said contacts of said other of said mho relays after said timing means has been in operation for a different predetermined length of time, and means controlled by one of said relays for initiating the operation of said timing means.

ALBERT R. van C. WARRINGTON.